United States Patent
Dao et al.

(10) Patent No.: US 6,591,909 B1
(45) Date of Patent: Jul. 15, 2003

(54) WHEY PROTEIN RETARDER

(75) Inventors: Bach Dao, Nieuw Vennep (NL); Marcel Rietjens, Delft (NL); Jan Pieter Vijn, Leiden (NL)

(73) Assignee: Halliburton Energy Services, Inc., Duncan, OK (US)

(*) Notice: Subject to any disclaimer, the term of this patent is extended or adjusted under 35 U.S.C. 154(b) by 0 days.

(21) Appl. No.: 10/026,027

(22) Filed: Dec. 20, 2001

(51) Int. Cl.$^7$ ............................................. E21B 33/138
(52) U.S. Cl. ..................... 166/293; 166/292; 166/305.1; 106/654
(58) Field of Search ..................... 166/285, 292–295, 166/305.1; 106/614–616, 645–658

(56) References Cited

U.S. PATENT DOCUMENTS

| | | | |
|---|---|---|---|
| 1,463,123 A | * 7/1923 | McAllister et al. | 106/609 |
| 4,120,736 A | 10/1978 | Childs et al. | 106/90 |
| 4,166,751 A | 9/1979 | Komeiji et al. | 106/650 |
| 4,236,849 A | * 12/1980 | Kennedy-Skipton | 405/259.6 |
| 4,329,448 A | 5/1982 | Cox et al. | 536/123 |
| 4,500,357 A | 2/1985 | Brothers et al. | 106/90 |
| 4,582,139 A | 4/1986 | Childs et al. | 166/293 |
| 4,676,832 A | 6/1987 | Childs et al. | 106/90 |
| 4,836,855 A | 6/1989 | Caillau et al. | 106/91 |
| 4,941,536 A | 7/1990 | Brothers et al. | 166/293 |
| 4,997,487 A | 3/1991 | Vinson et al. | 106/804 |
| 5,049,288 A | 9/1991 | Brothers et al. | 252/8.551 |
| 5,084,101 A | 1/1992 | Engels et al. | 106/624 |
| 5,220,960 A | 6/1993 | Totten et al. | 166/293 |
| 5,263,542 A | 11/1993 | Brothers | 166/293 |
| 5,264,470 A | 11/1993 | Eoff | 524/4 |
| 5,281,270 A | 1/1994 | Totten et al. | 106/687 |
| 5,340,397 A | 8/1994 | Brothers | 106/727 |
| 5,398,759 A | 3/1995 | Rodrigues et al. | 166/293 |
| 5,472,051 A | 12/1995 | Brothers | 166/293 |
| 5,484,478 A | 1/1996 | Brothers | 106/696 |
| 5,536,311 A | 7/1996 | Rodrigues | 106/724 |
| 5,672,203 A | 9/1997 | Chatterji et al. | 106/808 |
| 5,871,577 A | 2/1999 | Chatterji et al. | 106/808 |
| 6,419,016 B1 | * 7/2002 | Reddy | 166/293 |

OTHER PUBLICATIONS

Halliburton brochure entitled "HR–6L Cement Retarder" dated 1999.
Halliburton brochure entitled "HR–4 Cement Retarder" dated 1999.
Halliburton brochure entitled "HR–5 Cement Additive" dated 1998.
Halliburton brochure entitled "SCR–500L High–Temperature Retarder" dated 2000.
Halliburton brochure entitled "SCR–100 Cement Retarder" dated 1999.
Halliburton brochure entitled "Diacel LWL Cement Retarder/Fluid–Loss Additive" dated 1999.
Halliburton brochure entitled "HR–25 Cement Retarder" dated 1999.
Halliburton brochure entitled "HR–15 Cement Retarder" dated 1999.
Halliburton brochure entitled "HR–12 Cement Retarder" dated 1999.
Halliburton brochure entitled "HR–7 Cement Retarder" dated 1999.

* cited by examiner

*Primary Examiner*—David Bagnell
*Assistant Examiner*—Zakiya Walker
(74) *Attorney, Agent, or Firm*—Craig W. Roddy; Warren B. Kice

(57) ABSTRACT

A method and composition is provided using whey protein as a retarder in a cementing composition for use in cementing operations in a subterranean zone penetrated by a well bore.

27 Claims, No Drawings

WHEY PROTEIN RETARDER

BACKGROUND

The present embodiment relates generally to a retarder for delaying setting of a cementing composition in a subterranean zone penetrated by a well bore.

In the drilling and completion of an oil or gas well, a cementing composition is often introduced in the well bore for cementing pipe strings. In this process, known as "primary cementing," a cementing composition is pumped into the annular space between the walls of the well bore and the pipe string. The cementing composition sets in the annular space, supporting and positioning the pipe string, and forming a substantially impermeable barrier which divides the well bore into subterranean zones. After primary cementing, the undesirable migration of fluids between zones is prevented. Likewise, cementing compositions are often subsequently introduced into a subterranean zone for remedial operations to recover circulation or to plug the well bore.

Regardless of the motivation for introducing the cementing composition into a subterranean zone ("cementing operations"), with relatively hot or deep well bores it is often necessary to add a component, known as a "retarder," to the cementing composition to slow setting, thereby increasing pumping time. A variety of factors affect the effectiveness of a retarder, including settling tendencies, environmental friendliness, and temperature range. For example, retarders are usually considered as those suitable for use at 100–200° F. and retarders suitable for use at 200–300° F. These temperatures are based on downhole temperature measured while circulating fluid in the well bore, known as the bottomhole circulating temperature ("BHCT").

DESCRIPTION

The present embodiment provides for the use of whey protein as a retarder in a cementing composition for use in cementing operations in a subterranean zone penetrated by a well bore.

Whey is readily available as a by-product from the dairy industry, and contains lactose, some salts, and a variety of proteins, including bovine serum albumin "BSA" (molecular weight 66,000 Daltons), alpha-lactoglobulin (molecular weight 14,000 Daltons), and beta-lactoglobulin (molecular weight 16,000 Daltons). The proteins may be isolated from the whey, the isolated proteins being generally referred to as "whey protein." Whey protein is readily available from Borculo Whey Products, Borculo, Netherlands, under the trademark "PROXIME™." Whey protein has designated whey protein concentrations ("WPC") which vary from 10%–99%, and varying percentages of whey protein isolation ("WPI") to indicate purity. The isoelectric point occurs at a pH of 5.4 approximately, and whey protein is water-soluble at all temperatures.

A cementing composition according to the present embodiment basically comprises a slurry including whey protein as a retarder, a cementitious material ("cement"), and sufficient water to form the slurry.

In one embodiment, the whey protein is used as a retarder in the cementing composition.

In an alternative embodiment, the whey protein is denatured by conventional denaturants, such as urea or sodium dodecyl sulfate ("SDS"), and then treated with formaldehyde or another crosslinker, and then with tartaric acid, to form modified whey protein. The modified whey protein is then used as a retarder in the cementing composition.

The cement may be Portland cement API Classes A–H (and preferably API Class G cement), or may alternatively be slag cement, pozzolana cement, gypsum cement, high alumina content cement, or high alkalinity cement. The desired amount of cement is understandably dependent on the cementing operation.

As will be understood by those skilled in the art, the amount of whey protein retarder included in the cementing composition can vary depending upon the temperature and the particular pumping time required for the cementing operation. Generally, the whey protein retarder of either of the above embodiments is present in the cementing composition in an amount in the range of 0.1% to 4.0% by weight of the cement in the composition.

The water used to form the cementing composition slurry can be fresh water or salt water. The water is preferably included in the cementing composition in an amount in the range of 30% to 60% by weight of the cement.

As is readily comprehended by those skilled in the art, the cementing composition may contain additional components ("additives") to achieve desired properties. For example, the cementing composition may contain fine silica flour available from Halliburton Energy Services of Duncan, Okla., under the trademark "SSA-1™," fluid loss additives available from Halliburton Energy Services of Duncan, Okla., under the trademark "HALAD®-600LE+," weighting additives available from Halliburton Energy Services of Duncan, Okla., under the trademark "MICROMAX™," and bond improving/expanding additives available from Halliburton Energy Services of Duncan, Okla., under the trademark "MICROBOND HT™."

The following examples are illustrative of the methods and compositions discussed above.

EXAMPLE 1

Dyckerhoff Class G cement, sufficient water (44%) to form a slurry, and PROXIME™ whey protein powder in the percentages listed (by weight of the cement) in TABLE 1 were mixed to form slurries having a density of 1.91 kg/L. The whey protein used had a WPC of 25–80% and WPI of >80%. The order of mixing was water, retarder, and then cement.

The slurries were incubated at the temperatures listed below, and set times in hours:minutes are listed below in TABLE 1.

TABLE 1

| Whey % | 125° F. | 140° F. | 180° F. | 215° F. | 230° F. | 240° F. |
| --- | --- | --- | --- | --- | --- | --- |
| 0.5 | 5:12 | 4:05 | 3:04 | — | — | — |
| 0.75 | 7:41 | 6:10 | 4:20 | 2:20 | — | — |
| 1.0 | 9:36 | 8:10 | 6:12 | 3:19 | — | — |
| 1.5 | — | — | 10:20 | 4:09 | 2:23 | 2:09 |
| 2.0 | — | — | — | 4:49 | — | 2:49 |
| 3.0 | — | — | — | — | 2:52 | — |
| 3.5 | — | — | — | — | 3:31 | — |

As can be seen from the results listed in TABLE 1, increasing concentration of whey protein increased the set time at all temperatures tested, thereby providing retardation.

EXAMPLE 2

Dyckerhoff Class G cement (100 kg), sufficient water (44%) to form a slurry, SSA-1™ silica flour (35%), and modified (denatured) whey protein (in L of 19% solution) in the percentages listed in TABLE 2 were mixed to form slurries having a density of 1.91 kg/L. The order of mixing was water, additives, retarder, and then cement.

The 19% whey protein solution was formed with 30 grams of PROXIME™ whey protein powder dissolved in 120 mL of water. The whey protein used had a WPC of 25–80% and WPI of >80%. The amount of denaturant (urea) used was 3.3% by weight of the whey protein. With the exception of the results in the third results column in TABLE 2, the amount of formaldehyde used was 6.6% by weight of the whey protein. The slurry in the third results column contained no formaldehyde, but was otherwise identical to the other slurries. The amount of tartaric acid used was 25% by weight of the whey protein, the tartaric acid is available from Halliburton Energy Services of Duncan, Okla., under the trademark "HR®-25." The slurries were incubated at the temperatures listed below in TABLE 2, and thickening times (TT) for reaching viscosities of 70 BC and 100 BC are listed, as well as the respective rheologies.

The slurries were incubated at the temperatures listed below in TABLE 3, and thickening times (TT) for reaching viscosities of 30 BC, 70 BC, and 100 BC are listed, as well as the respective rheologies.

TABLE 3

|  | Synthetic retarder 311 ° F. | 311° F. | 311° F. | 375° F. |
|---|---|---|---|---|
| Modified Whey Protein (19% solution) | — | 1.5 gps | 1.5 gps | 0.95 gps |
| TT at 30 BC | — | 7:02 | 7:02 | 1:39 |
| TT at 70 BC | 1:36 | 7:02 | 7;04 | 1:41 |
| TT at 100 BC | 1:38 | 7:03 | 7:04 | 1:43 |
| Rheology after mix 300-200-100 | 180-126-65 | 190-138-75 (195° F.) | — | 139-94-48 (195° F.) |
| Rheology after mix 60-30-6-3 | 40-22-6-4 | 47-26-6-4 (195° F.) | — | 30-15-3-2 (195° F.) |

TABLE 2

|  | 240 ° F. | 275 ° F. | 300 ° F. | 300 ° F. | 330 ° F. |
|---|---|---|---|---|---|
| Modified Whey Protein (19% solution, in L/100 kg cement) | 10 | 10 | 10 (No formaldehyde) | 10 | 14 |
| TT at 70 BC | 10:06 | 5:36 | 0:22 | 2:13 | 4:04 |
| TT at 100 BC | 10:06 | 5:37 | — | 2:14 | 4:09 |
| Rheology 300-200-100 | 270-197-109 | 300-210-113 | 95-66-34 | 132-92-46 | 151-100-57 |
| Rheology 60-30-6-3 | 69-37-12-10 | 72-38-13-11 | 21-10-2-1 | 23-13-4-3 | 32-18-5-4 |

As can be seen from the results listed in TABLE 2, modified whey protein provides retardation at increased temperatures when crosslinked.

EXAMPLE 3

To form a cementing composition of a typical high temperature North Sea slurry design, Dyckerhoff Class G cement (100%), sufficient fresh water (4.51 gps) to form a slurry, SSA-1™ silica flour (35%), HALAD®-600LE+ fluid loss additive (0.8 gps), MICROMAX™ weighting additive (20%), and MICROBOND HT™ bond improving/expanding additive (4.0%) were mixed to form slurries having a density of 16.81 lb/gal when mixed with the following. The order of mixing was water, additives, retarder, and then cement.

The composition listed in the first results column of TABLE 3 had 0.2% of a suspension additive to prevent settling, available from Halliburton Energy Services of Duncan, Okla., under the trademark "SA-533™," and 0.6 gps of a synthetic retarder, available from Halliburton Energy Services of Duncan, Okla., under the trademark "SCR-500L™."

The compositions listed in the second, third, and fourth results column of TABLE 3 had modified (denatured) whey protein (19% solution) in the percentages listed in TABLE 3. The 19% whey protein solution was formed with 30 grams of PROXIME™ whey protein powder dissolved in 120 mL of water. The whey protein used had a WPC of 25–80% and WPI of >80%. The amount of denaturant (urea) used was 3.3% by weight of the whey protein. The amount of formaldehyde used was 6.6% by weight of the whey protein. The amount of tartaric acid used was 25% by weight of the whey protein.

As can be seen from the results listed in TABLE 3, modified whey protein provides retardation at increased temperatures. No gellation problems were observed for the modified whey protein cementing compositions. The synthetic retarder cementing composition had a gellation problem, in that it displayed too short a thickening time.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims.

What is claimed is:

1. A method of cementing in a subterranean zone penetrated by a well bore comprising:
    preparing a cementing composition comprising cement, sufficient water to form a slurry, and whey protein;
    placing the cementing composition into the subterranean zone; and
    allowing the cementing composition to set therein.

2. The method of claim 1 wherein the whey protein is present in a range of 0.1% to 4.0% by weight of the cement in the cementing composition.

3. The method of claim 1 wherein the whey protein comprises bovine serum albumin, alpha-lactoglobulin, and beta-lactoglobulin.

4. The method of claim 1 wherein the whey protein has been denatured and crosslinked.

5. The method of claim 4 wherein the whey protein is further treated with tartaric acid.

6. The method of claim 1 wherein the cement is Portland cement, slag cement, pozzolana cement, gypsum cement, high alumina content cement, or high alkalinity cement.

7. The method of claim 1 wherein the water is fresh water or salt water.

8. The method of claim 1 wherein the water is present in the cementing composition in an amount in the range of 30% to 60% by weight of the cement in the cementing composition.

9. A method of cementing in a subterranean zone penetrated by a well bore comprising:

preparing a cementing composition comprising cement, sufficient water to form a slurry, and whey protein, the whey protein present in a range of 0.1% to 4.0% by weight of the cement in the cementing composition;

placing the cementing composition into the subterranean zone; and allowing the cementing composition to set therein.

10. A method of cementing in a subterranean zone comprising the steps of:

preparing a cement composition comprising cement and water;

using whey protein to retard the cement composition;

placing the cement composition into the subterranean zone; and allowing the cement composition to set therein.

11. The method of claim 10 wherein the whey protein is present in a range of 0.1% to 4.0% by weight of the cement in the cementing composition.

12. The method of claim 10 wherein the whey protein comprises bovine serum albumin, alpha-lactoglobulin, and beta-lactoglobulin.

13. The method of claim 10 wherein the whey protein has been denatured and crosslinked.

14. The method of claim 13 wherein the whey protein is further treated with tartaric acid.

15. The method of claim 10 wherein the cement is Portland cement, slag cement, pozzolana cement, gypsum cement, high alumina content cement, or high alkalinity cement.

16. The method of claim 10 wherein the water is fresh water or salt water.

17. The method of claim 10 wherein the water is present in the cementing composition in an amount in the range of 30% to 60% by weight of the cement in the cementing composition.

18. The method of claim 10 wherein the temperature of the subterranean zone is in a range of 125° F. to 400° F.

19. A method of cementing in a subterranean zone comprising the steps of:

preparing a cement composition comprising cement, sufficient water to form a slurry, and whey protein comprising bovine serum albumin, alpha-lactoglobulin, and beta-lactoglobulin;

placing the cement composition into the subterranean zone; and allowing the cement composition to set therein.

20. The method of claim 19 wherein the whey protein is present in a range of 0.1% to 4.0% by weight of the cement in the composition.

21. The method of claim 20 wherein the whey protein has been denatured and crosslinked.

22. The method of claim 21 wherein the whey protein is further treated with tartaric acid.

23. The method of claim 19 wherein the cement is Portland cement, slag cement, pozzolana cement, gypsum cement, high alumina content cement, or high alkalinity cement.

24. The method of claim 19 wherein the water is fresh water or salt water.

25. The method of claim 19 wherein the water is present in an amount in the range of 30% to 60% by weight of the cement in the composition.

26. The method of claim 19 wherein the temperature of the subterranean zone is in a range of 125° F. to 400° F.

27. The method of claim 19 wherein the whey protein comprises a whey protein concentration in the range of from 10% to 99%.

* * * * *